United States Patent [19]

Lytle

[11] 4,240,701
[45] Dec. 23, 1980

[54] ALL PLASTIC PROJECTION LENS ASSEMBLY WITH ASPHERIC SURFACE

[75] Inventor: John D. Lytle, San Jose, Calif.

[73] Assignee: M.U. Engineering & Manufacturing, Inc., Mountain View, Calif.

[21] Appl. No.: 914,395

[22] Filed: Jun. 12, 1978

[51] Int. Cl.³ ............................. G02B 3/04; G02B 9/34
[52] U.S. Cl. ............................. 350/189; 350/175 NG; 350/223
[58] Field of Search ................. 350/175 NG, 189, 223

[56] References Cited

U.S. PATENT DOCUMENTS

| 3,205,774 | 9/1965 | Estes | 350/226 |
|---|---|---|---|
| 3,361,512 | 1/1968 | Fuller | 350/190 |
| 3,423,146 | 1/1969 | Weavar | 350/44 |
| 3,516,735 | 6/1970 | Goodell | 350/220 |
| 3,998,527 | 12/1976 | Ikeda | 350/189 |
| 4,015,897 | 4/1977 | Konoma et al. | 350/209 |
| 4,035,063 | 7/1977 | Ikeda | 350/223 X |
| 4,060,312 | 11/1977 | Linke et al. | 350/189 |

Primary Examiner—F. L. Evans
Assistant Examiner—Scott J. Sugarman
Attorney, Agent, or Firm—Jackson, Jones & Price

[57] ABSTRACT

An all plastic lens assembly having a lens cell or housing and at least four separate airspaced lens elements mounted in the cell or housing, the lens elements are formed of plastic and at least one of the lens elements has an aspheric surface.

15 Claims, 2 Drawing Figures

| ELEMENT | SURF. | AIR SP. | THICK | RADIUS | C.A.DIA. | MATL | $n_d$ | $v_d$ | DIA. |
|---|---|---|---|---|---|---|---|---|---|
| A | 1 | | 2.42 | 15.56CX | 10.95 | ACRYL | 1.4917 | 57.2 | 13.0 |
|  | 2 | | | 174.3CC | 10.24 | | | | 13.0 |
|  |  | 0.20 | | | | | | | |
| B | 1 | | 2.74 | 9.94CX | 9.35 | ACRYL | 1.4917 | 57.2 | 11.0 |
|  | 2 | | | 120.8CX | 8.16 | | | | 11.0 |
|  |  | 0.20 | | | | | | | |
| C | 1 | | 5.00 | 68.06CC | 8.04 | PSTYREN | 1.5910 | 30.9 | 11.0 |
|  | 2 | | | 6.66CC | 6.74 | | | | 10.0 |
|  |  | 7.98 | | | | | | | |
| D | 1 | | 5.00 | 8.12CX | 10.20 | ACRYL | 1.4917 | 57.2 | 12.0 |
|  | 2 | | | 13.57CC | 9.03 | | | | 12.0 |

ASPHERIC SAG $Z = \dfrac{CY^2}{1+[1-C^2Y^2]^{\frac{1}{2}}} + DY^4 + EY^6$

WHERE $C = .07367$, $D = 3.23589 \times 10^{-4}$, $E = 6.34843 \times 10^{-6}$

ALL PLASTIC PROJECTION LENS ASSEMBLY WITH ASPHERIC SURFACE

BACKGROUND OF THE INVENTION

Multi-element lens systems have heretofore been provided. Typically, however, they have been made of glass with spherical surfaces. Such lens systems have greatly increased in cost. There is a need for lower cost lens systems particularly in microfiche readers and the like. There is therefore a need for an improved projection lens assembly.

SUMMARY OF THE INVENTION AND OBJECTS

The lens assembly of the present invention consists of a lens cell which preferably is formed of plastic. At least four separate airspaced lens elements also formed of plastic are mounted in the cell and are identified as first, second, third and fourth lens elements providing a final focal ratio of approximately 2.8. The first and second lens elements are nominally plano-convex. The third lens element is nominally plano-concave and the fourth lens element is a meniscus. At least one of the surfaces of the fourth lens element is aspheric.

In general, it is an object of the present invention to provide a high resolution, flat field projection lens assembly which is formed entirely of plastic.

Another object of the invention is to provide a lens assembly of the above character which has four elements and whose assembly procedures are greatly simplified compared to similar glass systems.

Another object of the invention is to provide lens elements of the above character which can be readily and inexpensively manufactured.

Another object of the invention is to take advantage of the ease with which aspheric surfaces may be implemented in plastic.

Additional objects and features of the invention will appear from the following description in which the preferred embodiments are set forth in conjunction with the accompanying drawings.

DESCRIPTION OF THE PREFERRED EMBODIMENT

Figures 1, 2:
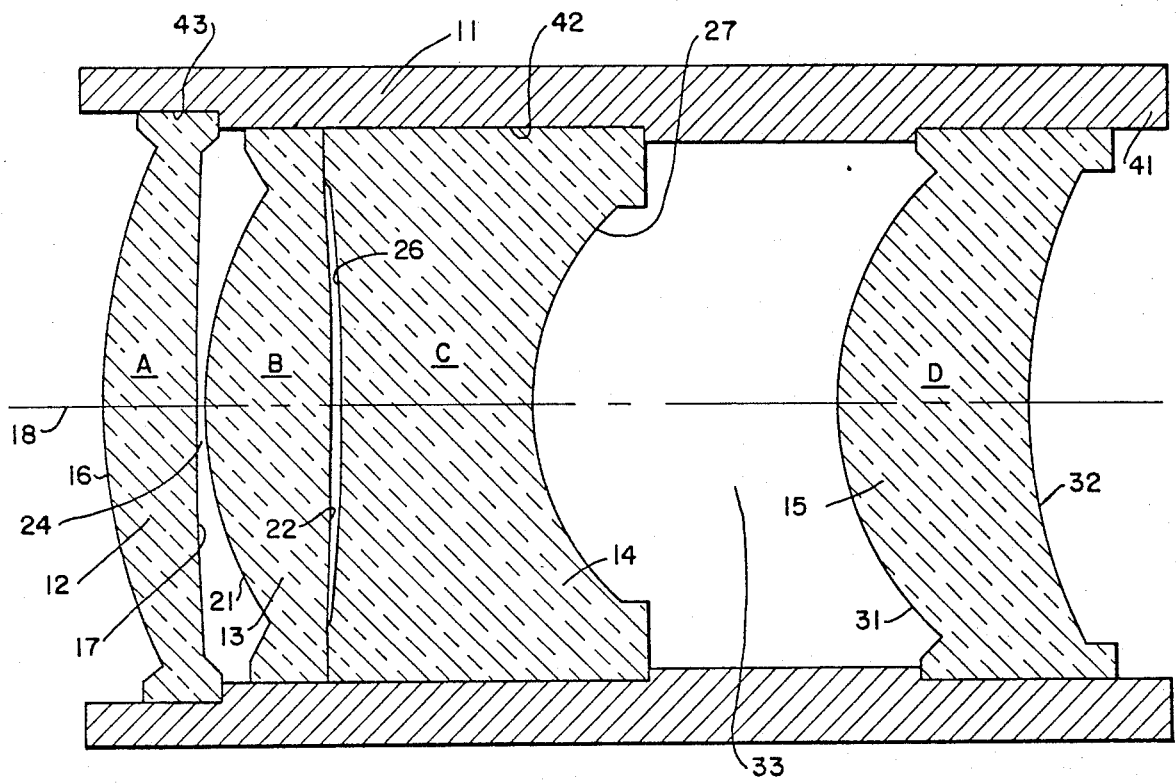
FIG. 1 is a cross sectional view of a lens assembly incorporating the present invention.
FIG. 2 is a table of constructional parameters summarizing a typical example of the optical system utilized in the lens assembly shown in FIG. 1.

The lens assembly consists of a lens cell or housing 11 which can be manufactured of any suitable material but preferably in connection with the present invention is injection molded of plastic.

A plurality of at least four lens elements identified as first lens element 12, second lens element 13, third lens element 14 and fourth lens element 15 and also identified as lens elements A, B, C and D in FIG. 2 are provided. The lens elements 12 through 15 are all injection molded of plastic as hereinafter described and are mounted in spaced apart positions so that they are separated by air. The lens elements have various characteristics as hereinafter described. However at least one of the lens elements is provided with an aspheric surface as also hereinafter described. The lens elements are formed of optical grade plastic. For example lenses A, B and D are formed of methyl methacrylate having an index of refraction of 1.4917 whereas the third lens element 14 or C is formed of polystyrene having an index of refraction of 1.5910.

In the example shown, the first lens element 12 or A has an approximately plano-convex configuration and has a first surface 16 also identified as surface 1 in FIG. 2 and a second surface 17 identified as surface 2 in FIG. 2. The surface 16 is a convex surface and has a radius of 15.56 millimeters. The second surface 17 is substantially planar but is slightly concave and has a radius of 174.3 millimeters. The first surface 16 has a clear aperture diameter of 10.95 millimeters whereas the second surface 17 has a clear aperture diameter of 10.24 millimeters. The methyl methacrylate has a $v_d$ (which characterizes its dispersive properties) of 57.2, whereas the polystyrene has a $v_d$ of 30.9. The first lens element 12 has an vertex thickness along the axis 18 of 2.42 millimeters.

The second lens 13 or B has a first surface 21 or 1 as shown in FIG. 2 and a second surface 22. The lens is basically plano-convex as is lens 1. The first surface 21 has a radius of 9.94 millimeters and the second surface is generally planar but slightly convex and has a radius of 120.8 millimeters. The second lens 13 has an axial thickness of 2.74 millimeters. A 0.2 millimeter air space 24 follows the second surface 17 of the lens element 12 and the surface 21 of the second lens element 13.

The third lens element 14 or C is plano-concave and is provided with a first surface 26 and a second surface 27. The first surface is nominally planar, but is slightly concave and has a radius of 68.06 millimeters. The second surface 27 is deeply concave and has a radius of 6.66 millimeters. The third lens element 14 has an axial thickness of 5 millimeters. An air space 28 is provided between the surface 26 and the surface 22 of 0.2 millimeters.

The fourth lens element 15 or D is convex-concave with a first convex surface 31 and a second concave surface 32. The surface 31 has a radius of 8.12 millimeters whereas the surface 32 has a radius of 13.57 millimeters. The lens element 32 has an axial thickness of 5 millimeters. An air space 33 separates surface 27 of lens element 14 and surface 31 of lens element 15, having a dimension of 7.98 millimeters along the axis 18. It will be noted that the fourth lens element 15 is meniscus shaped. The last or second surface of the fourth lens 15 is strongly aspheric to correct for astigmatism. The shape of this surface 32 in the example shown is defined by the polynomial equation in which $$\text{Aspheric SAG } Z = \frac{CY^2}{1 + [1 - C^2Y^2]^{\frac{1}{2}}} + DY^4 + EY^6$$

where
$C = 0.07367$
$D = 3.23589 \times 10^{-4}$
$E = 6.34843 \times 10^{-6}$

Use of an aspheric surface in the design of the present lens assembly is facilitated by the use of plastic. The use of plastic as an optical material enables the complement of the aspheric surface to be generated in the mold and thereafter the lenses can be replicated from the mold to replicate the aspheric surface in the injection molded part.

The present lens assembly has been designed to operate at an effective focal length of 27 millimeters. However, it should be appreciated that the focal length may be changed by scaling the lens parameters up or down.

By way of theoretical performance calculations based upon an unvignetted pupil at all field angles operating at full aperture, the present lens assembly has a distortion of less than 0.6% at full field and less than 0.4% at 7/10 of full field. Field coverage is ±10°; infinity conjugate focal ratio is 2.8 with the ideal reduction ratio being 0.0272. The effective focal length is 27.0 millimeters. Axial image contrast at 100 1/mm is in excess of 75% (polychromatic), and is in excess of 30% at all field points. At 200 1/mm the axial image contrast is in excess of 45%, dropping to 20% at the edge of the field. Since this system was designed for use in the visible portion of the spectrum, appropriate spectral weighting has been assumed in all performance predictions.

It should be appreciated that certain of the design parameters set forth above can be varied over a reasonable range without departing from the scope of the present invention. Thus by way of example, the radius of curvature of the various surfaces shown could be varied by 1% and the thickness of the lens elements could be varied by 0.1 mm.

The lens elements when injection molded in plastic can be secured in the lens cell 11 by suitable means such as solvent bonding, heat staking, or by ultrasonic welding. In the construction shown in FIG. 1, the lens element is mounted in an annular recess 41, whereas the lens elements 13 and 14 are mounted in an annular recess 42 with the separation between the lens elements 13 and 14 being controlled by annular portion 14a being provided on the outer margin of the lens element 14. The position of the lens element 12 is controlled by an annular recess 43 formed in the cell 11. Thus it can be seen that the lens elements can be readily assembled within the cell without precise fixturing or jigs and still maintain the required spacing and alignment between the lens elements to provide the desired design.

The lens assembly shown has been adapted for use in microfiche readers where substantial magnification is required, as, for example, a magnification of 36. It should, however, be appreciated that the lens assembly is not limited to use in microfiche applications. For example, it can be used in many image transfer applications. In fact, it can be utilized in any application where it is desired to magnify or demagnify image fields in white or monochromatic light. Thus for example the lens assembly could be used to enlarge or reduce an image formed in a laser scanner. The system is also, by virtue of its design performance, suitable for use in infinity object conjugate applications, such as in miniature cameras, and so on.

It should be appreciated that since the lens assembly is provided with four optical elements, there are eight separate optical surfaces. In order to reduce reflection loss from the individual surfaces, it may be desirable to provide at least a single layer anti-reflection coating on each surface of the lens. If it is desired to increase still further the efficiency of the lens, more sophisticated anti-reflection coatings can be provided on the surfaces of the lens elements.

What is claimed is:

1. A lens assembly comprising a lens cell and at least four separate airspaced lens elements mounted in said cell and identified as first, second, third and fourth lens elements, each of said lens elements having first and second optical surfaces, each of said lens elements being injection molded of a plastic material, the second surface of the fourth lens element having an aspheric surface, said aspheric surface having an aspheric SAG Z equal to $$\frac{CY^2}{1 + [1 - C^2Y^2]^{\frac{1}{2}}} + DY^4 + EY^6$$

where
   $C = 0.07366$
   $D = 3.23589 \times 10^{-4}$
   $E = 6.34843 \times 10^{-6}$.

2. A lens assembly as in claim 1 wherein said first, second and fourth lens elements are formed of an acrylic and wherein said third lens element is formed of polystyrene.

3. A lens assembly as in claim 2 wherein said acrylic has an index of refraction of approximately 1.49 and wherein said polystyrene has an index of refraction of approximately 1.59.

4. A lens assembly comprising a lens cell and at least four separate airspaced lens elements mounted in said cell and identified as first, second, third and fourth lens elements, each of said lens elements having first and second optical surfaces, each of said lens elements being injection molded of a plastic material, the second surface of the fourth lens element having an aspheric surface, said first, second, third and fourth lens elements having optical thicknesses along the optical axis of the lens assembly of 2.42, 2.74, 5.00 and 5.00 millimeters respectively and a spacing between the first and second lens elements of 0.2 millimeters and a spacing between the second and third lens elements of 0.2 millimeters and a spacing between said third and fourth lens elements of 7.98 millimeters.

5. A lens assembly as in claim 4 wherein said first lens element has a convex surface having a radius of 15.56 millimeters, said second concave surface having a radius of 174.3 millimeters, said second lens element has first and second convex surfaces having radii of 9.94 and 120.8 millimeters respectfully, said third lens element has concave surfaces having radii of 68.06 and 6.66 millimeters respectively, and wherein said fourth lens element has convex and concave surfaces having radii of 8.12 and 13.57 millimeters respectively.

6. A plastic lens assembly of limited field angle and relatively high speed comprising, along the optical axis from the object to image side, of the following plastic lens elements;
   a first positive lens element with a convex surface on the object side;
   a second positive lens element with a convex surface on the object side;
   a third negative lens element substantially thicker along the optical axis than either of the individual thicknesses of the first and second lens elements along the optical axis, and
   a fourth lens element substantially thicker along the optical axis than either of the individual thicknesses of the first and second lens elements along the optical axis, one surface of the fourth lens element having an aspheric shape to correct aberrations.

7. A lens assembly as in claim 6 wherein said first and second lens elements are substantially of a plano-convex shape, said third lens is substantially of a plano-concave shape, and said fourth lens element is of substantially a meniscus concave-convex shape.

8. The invention of claim 6 wherein the image side surface of the fourth lens element has the aspheric shape to control Seidel distortion, higher order astigmatism and field curvature.

9. The invention of claim 6 wherein the field angle is approximately 20°.

10. The invention of claim 6 wherein the focal ratio is approximately 2.8.

11. The invention of claim 8 wherein the thickness to diameter ratio of the third and fourth lens elements is greater than 1 to 3.

12. The invention of claim 8 wherein the first, second and fourth lens elements are formed of methyl methacrylate and the third lens element is formed of polystyrene.

13. A plastic lens assembly of limited field angle and relatively high speed comprising, along the optical axis from the object to image side, of the following plastic lens elements;

a first positive lens element with a convex surface on the object side;

a second positive lens element with a convex surface on the object side;

a third negative lens element approximately twice as thick along the optical axis as either the individual thickness of the first and second lens elements along the optical axis, and a fourth meniscus shaped lens element approximately twice as thick along the optical axis as either the individual thickness of the first and second lens elements along the optical axis, the image side surface of the fourth lens element having an aspheric shape to correct aberrations.

14. The invention of claim 13 wherein the first, second and fourth lens elements are formed of methyl methacrylate and the third lens element is formed of polystyrene.

15. The invention of claim 14 wherein the thickness to diameter ratio of the third and fourth lens elements is greater than 1 to 3.

* * * * *